Aug. 23, 1927.

W. C. HART 1,640,076

FORMATION OF LABELS, SYMBOLS, AND THE LIKE ON GLASS CONTAINERS

Filed March 24, 1926 2 Sheets-Sheet 1

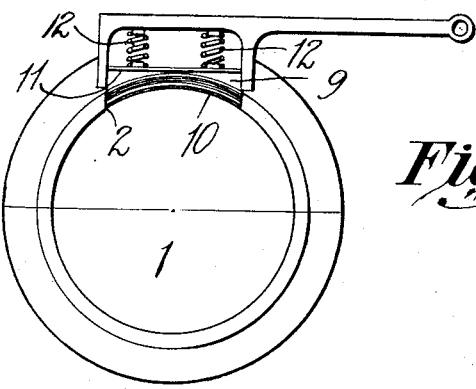
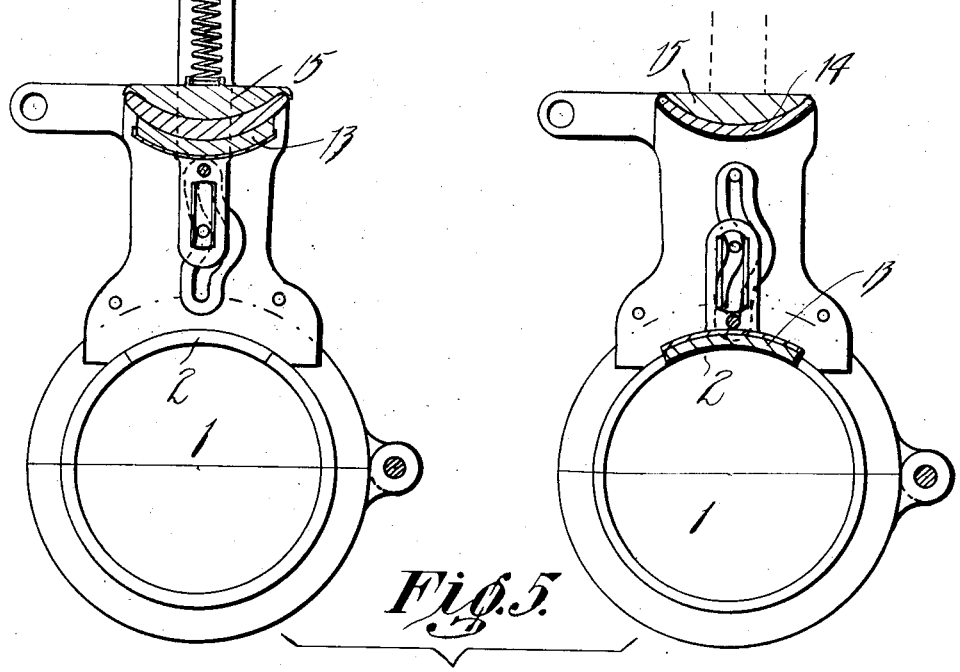
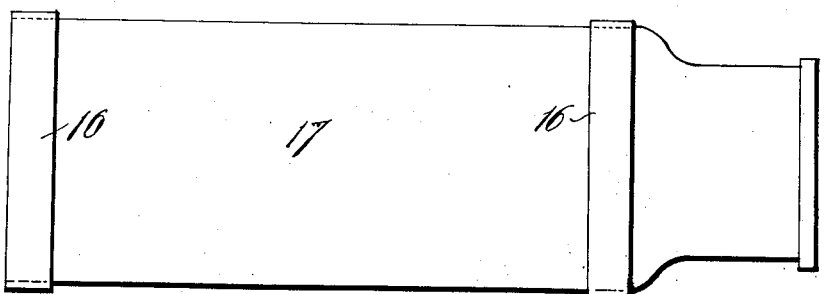

Patented Aug. 23, 1927.

1,640,076

UNITED STATES PATENT OFFICE.

WILLIAM CLIFTON HART, OF ADELAIDE, SOUTH AUSTRALIA, AUSTRALIA.

FORMATION OF LABELS, SYMBOLS, AND THE LIKE ON GLASS CONTAINERS.

Application filed March 24, 1926, Serial No. 97,061, and in Australia April 6, 1925.

This invention relates to the formation of labels, symbols and the like on glass containers, and colouring the same while the container is hot in the mould and preferably at the same time the glass is blown and while it is in a viscous state in either the pattern or finishing mould, but preferably in the finishing mould of a glass blowing machine.

The labels or the like are formed on the containers by indenting, or by raising to type high, or on the plain surface, but for practical purposes it is preferred that type high surfaces be employed in the formation of labels and the like according to this invention.

The basic principle underlying this invention consists in the provision of means, combined with the blowing of glass containers and while the glass is in a viscous state, whereby the labels are coloured or multicoloured, so that the colouring will melt and become adhesively part and parcel of the label or symbol desired on the container thus obviating the use of paper labels commonly used and now affixed by separate machines after the containers are cool.

The process embodied in the invention consists firstly, in grinding, filing or cutting the outlines of the label or labels or symbols completely through the mould so that the glass in its viscous or molten state will be blown into the mould and to the line of the label surface desired, and secondly, simultaneously with the blowing and while the glass is in its viscous state, causing the viscous glass at the label portion of the mould to come into contact with a pad or pads, or transfers in a colour block holder, or a moving belt, or film carrying colours, which while conforming to the label or symbol, in one or multicolours, melt into the glass with the result that the container is blown with the coloured label or symbol as a part thereof.

The apparatus employed consists firstly, of a mould formed with the label cut-outs, secondly, a glass blowing machine or alternatively, manual blowing devices, and thirdly, colouring pads or transfers in a colour block holder, or a conveyor carrying colour, adapted to pass in the case of pads into the mould label openings, or in the case of a conveyor over the surface of the mould label openings according to whether the label is to be on a plain surface, an indented surface or type high surface, it being obvious that the pads, blocks, conveyor or film prevent the viscous glass from being blown through the outside of the mould.

In order to disclose means for carrying the invention into practical effect it will now be described with reference to the accompanying drawings in which type high coloured or multi-coloured labels are combined in the glass of glass containers.

In the drawings—

Figure 4 illustrates a mould with a suitably supported block containing transfers, said transfers passing into the label cut away of the mould.

Figure 5 illustrates an alternative means of imparting colours to the container, and Figure 6 is a view illustrating an essential detail.

Figure 1:
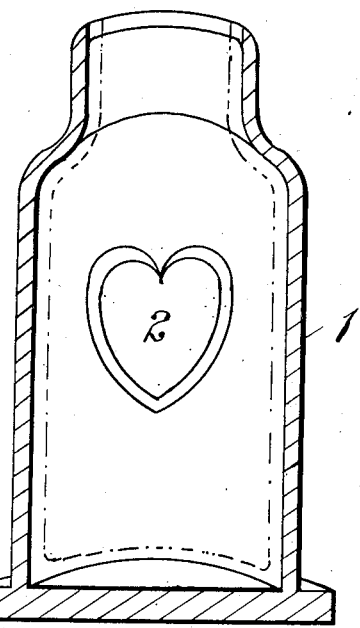
Figure 1 illustrates in perspective a sectional view of a mould showing a label, such as a heart, cut through the thickness thereof.
Figure 2:
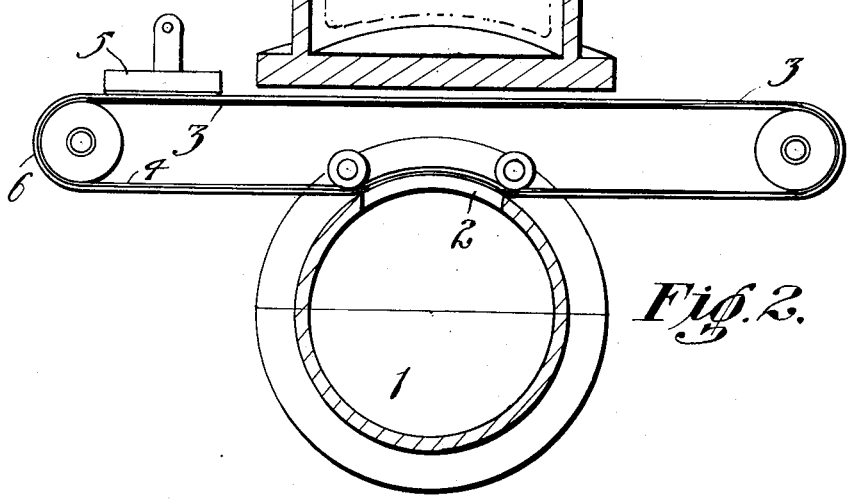
Figure 2 illustrates a band or film contacting with the outer surface of the mould and covering the area taken up by the label area or cut away, said band being capable of imparting a single colour, multicolors or transfers to the viscous glass in the mould cuts.

According to this invention the mould 1 is cut away as at 2, to the particular formation or area of the proposed label or part label. The cut away portions 2 are ground or cut to allow of an opening completely through the mould in the manner of the cutting of a metal stencil.

Each mould 1 is placed in a glass blowing machine and the usual operation of glass blowing is performed, the molten or viscous glass for type high surfaces entering the area 2 to the outer surface of the mould and when in that condition contacts with a belt or film 3, carrying a colour, or zoned to carry multicolours.

This belt or film 3 is adapted to move over said surface 2 and being in contact with and covering the area of the label cut in the mould prevents the molten glass from blowing through.

The belt 3 may carry transfers in which case it would be timed to move each transfer into line with the label cut away 2 in the mould during or simultaneously with each blowing of a container.

The belt 3 when carrying colours preferably has a thin steel base 4 with an asbestos cover 6 and is adapted to pass through or over a colour supply 5 so that the asbestos lining 6 may be always in a condition to impart colour to the molten glass in the label cut away 2 of the mould 1.

By imparting colour or colours or transfers to the viscous glass in the mould cut away or cut aways to form the label, the colour or transfer melts into or permeates the glass at this point and when removed from the mould the label is embedded in and forms a part of the glass container.

Figure 3:
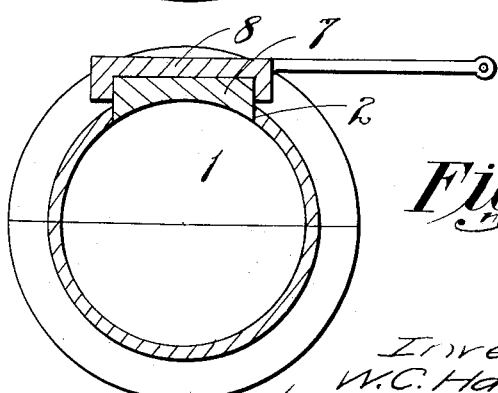
Figure 3 illustrates a mould with a label cut away having a suitably supported coloured pad disposed in said cut away.

As abovementioned the colours or transfers may be applied in many ways and certain alternative means are illustrated in Figures 3, 4 and 5 of the drawings.

In Figure 3 colour pads 7 are supported in holding blocks 8, the pads being shaped to conform to the area of the label cut away portions 2 of the mould 1 and are adapted to cover the outer surface or enter therein according to whether type high or surface or indented labels are to be formed in the container.

Figure 4 illustrates a block 9 positioned to carry transfers 10, said transfers 10 being adapted to be pressed into the mould cut away portions 2, as they may be required, and on each moulding of a glass container, by a plate 11 against which springs such as 12 are adapted to bear.

In Figure 5 the pads 13 entering the mould cut away portions 2 may be adapted so that they are continually replenished with colour or colours by the pad 14 in the block 15, the pads 13 being adapted to turn over in a half-circle, receive colouring and return between each moulding of a container.

It will be obvious that several alternative means for the application of the colour to the viscous glass at the cut away portions may be employed and also the colours may be applied to cold glass containers in the manner hereinafter described.

Where it is desired to have a more attractive label or design on plain container, having varying shades of colour, as for instance, in a peach denoting peach jam and the like it is proposed to make a transfer of suitable substances so that such transfer can be placed one by one in the colour block holder attached to the container mould, in place of colour blocks.

The heat from the container, when in the mould, will cause the transfer to become adhesively and permanently attached to the container, and cannot be removed by washing or general usage.

In this instance, the high type and indented label surfaces are done away with and the application is made to a plain bodied container mould.

Instead of using colour blocks or transfers in the holder attached to the mould, in which case transfers would be put in singly after each one was used, I propose to have the colours of the transfers placed on a band made of suitable substances in order that such colours or transfers may be drawn in line or in single file through the holder, attached to the mould, in a like manner as a cinematograph film is passed before a lantern lens.

The colour or transfer band would work in stages in order that when each container is taken from the mould the colour or transfer used thereon will be automatically replaced by a fresh lot by the moving of the band.

The band or bands may be one or in multiple and may pass right round the mould or work upward or the reverse or transversely.

If it is desired to label, say plain bodied containers when cold after being moulded, it is proposed to make a transfer of the desired symbol or label of suitable substances. This transfer or label will be placed on the container to be labelled or embellished and then pasted over with a suitable varnish or glaze and placed in a receptacle of sufficient heat to cause the transfer or label design to permanently adhere to the container.

Alternatively the transfer or an ordinary paper label may be treated with a varnish or glaze of suitable substance and placed on the container and air dried which will cause the transfer or paper label to become permanently affixed to the container.

The transfer or paper label may also be affixed inside the container, instead of on the outside.

In some instances where the symbol or design is not required to be of so high a standard as that obtained by a transfer design, I propose having the design or label made of suitable absorbent substances to take the colours, and set up in a suitable holder of wood or metal.

Each part of such design may be in a different colour, as for instance, a plum denoting preserved plums, and this may be in one colour, the manufacturer's name in another colour and the place of origin in another and the like.

To impart one or multiple colours to this label or design as set up in the design holder I propose to have a colour pad or pads so divided that each colour pad or pads will be in conformity with those parts of the design or label to be variously coloured.

After the design has been coloured it is applied to the cold plain bodied containers and heated to a sufficient heat, or the design after drying is passed over with a quick drying glaze or varnish and slightly heated or air dried which will cause the label to become permanently affixed to the container.

On containers or jars having high type surfaces where the colouring is to be done after the container is cold I propose to colour the surfaces, which are put on in the mould by passing the container along on top of, underneath or in between a coloured revolving band or any number of them, according to the number of colours to be used.

Alternatively the band or bands may be stationary and the container with its high type surfaces passed over the top of the lower one.

The colour is imparted to the stationary band or bands by suitably fed pads wiping the band or bands after each container, or a multiple of them, has passed over.

An essential feature in the colouring of these high type surfaces is the use of two rings or circles 16 placed round the container 17 as illustrated in Figure 6, in order to prevent the colouring from the band or bands, colouring any other part of the container except the high surfaces. These rings or circles 16 may be put on the container when being moulded and become part of the container.

Where the container has been moulded with indented surfaces, or a combination of both high type and indented, and it is desired to colour the container, the same is coloured by the same means as for high type surfaces, the exception being that no rings or circles are necessary.

It will be noticeable that when these containers with indented surfaces are thus treated the indented surfaces will be the same colour as the container or the contents that will be put into it. Containers with these surfaces may have the colour put on whilst the container is hot in the mould as before mentioned and such colour may be applied all the way up the jar, bottle or container or only portion of it.

Alternatively for plain bodied containers, jars or bottles, viz, not high type or indented surface, I propose to colour or label these by having the label or design made from a suitable substance, preferably rubber, and placed in a suitable position so that the plain bodied cold container will roll over it and pick up the colour or colours placed on the label or design.

An essential feature in the making of this label or design is that in the lettering and the like each letter and the like is slightly hollowed out in order to get a greater body of colour on to the body of the container.

The colour or colours may be imparted to the design or label either by pads or rollers passing over it or a pad or pads preferably made of gauze and felt or a porous composition operating overhead and descending downwards on to the design. In the case where multiple colours are to be applied each roller or pad will have a separate colour imparted to it by suitable means.

In the case of the colour pad or pads operating overhead and downwards on to the design the pad or pads are formed in divisions, so that each division contains a different colour and which division conforms to the different colours desired on the design or label. All these various colours are put on in one operation by the descent of the divisional pad's holder. Each divisional pad may be automatically fed with suitable cup or feed preferably affixed to the top or side of pad division and so regulated as to drop or run the colour on to the pad as same is used or absorbed by the plain bodied container passing over the design.

In place of using colour pads for colouring the design colour powders may be used in the label or design in which case the design letter or lettering would be entirely hollowed out in order to allow the colour or colours being squeezed up through them as the colour powder was absorbed by the plain container passing over the surface. In this instance, the container would be first coated with a suitable sticky substance to which the colour powder will adhere.

The container is then, after being so labelled, heated to a suitable temperature or air dried when the label becomes permanently fixed.

I desire it to be understood that various improvements and modifications may be embodied without departing from the spirit and mode of operation of this invention.

What I claim as my invention and desire to secure by Letters Patent is:—

1. A process for the purposes specified characterized in that a label or symbol of one or a plurality of colours is applied to a glass container during the operation of blowing the container in the mould and while the glass is in a viscous condition.

2. A process for the purposes specified consisting in forming a mould, by means of which a glass container is formed with ground or cut label outlines passing completely through the mould from the outside and the inside, blowing the glass in the mould to form the container and simultaneously while the glass is in its viscous condition causing the glass at the label formations in the mould to come into contact with means for supplying colouring or transfers which melt with the glass with the result that the container is blown with the coloured label or symbol as a part thereof.

3. In a process for the purposes specified applying a colouring or colourings to a plain surfaced glass container by a transfer so that the heat from the container when in the mould will cause the transfer to become adhesively and permanently attached to the container.

Signed at Adelaide, South Australia, Australia, this 19th day of February, 1926.

WILLIAM CLIFTON HART.